United States Patent
Dingsoyr et al.

(10) Patent No.: US 7,393,407 B2
(45) Date of Patent: Jul. 1, 2008

(54) SILICON OXIDE SLURRY AND METHOD FOR PRODUCING SUCH SLURRY

(75) Inventors: Eldar O Dingsoyr, Sogne (NO); Magne Dastol, Kristiansand (NO); Cor Oldenziel, EW Rotterdam (NL); Bjorn Vassoy, Stavanger (NO)

(73) Assignee: Elkem ASA (NO)

( * ) Notice: Subject to any disclaimer, the term of this patent is extended or adjusted under 35 U.S.C. 154(b) by 561 days.

(21) Appl. No.: 10/518,154

(22) PCT Filed: Apr. 24, 2003

(86) PCT No.: PCT/NO03/00135
§ 371 (c)(1), (2), (4) Date: Dec. 9, 2004

(87) PCT Pub. No.: WO03/106368
PCT Pub. Date: Dec. 24, 2003

(65) Prior Publication Data
US 2005/0172864 A1     Aug. 11, 2005

(30) Foreign Application Priority Data
Jun. 17, 2002   (NO) .................................. 20022884

(51) Int. Cl.
C04B 30/00   (2006.01)
C04B 24/38   (2006.01)
C09K 8/08    (2006.01)
C09K 8/10    (2006.01)

(52) U.S. Cl. ...................... 106/823; 106/490; 106/729; 106/730; 106/737; 106/804; 106/805; 507/110; 507/112; 507/113; 507/114

(58) Field of Classification Search ................. 106/490, 106/729, 730, 737, 804, 805, 823; 507/110, 507/112, 113, 114
See application file for complete search history.

(56) References Cited

U.S. PATENT DOCUMENTS

| | | | | |
|---|---|---|---|---|
| 4,557,763 A | * | 12/1985 | George et al. | 106/706 |
| 5,149,370 A | * | 9/1992 | Olaussen et al. | 106/737 |
| 6,478,868 B1 | * | 11/2002 | Reddy et al. | 406/696 |
| 2002/0059885 A1 | * | 5/2002 | Prat et al. | 106/737 |

FOREIGN PATENT DOCUMENTS

EP     467921 A     10/1990

* cited by examiner

*Primary Examiner*—David M Brunsman
(74) *Attorney, Agent, or Firm*—Lucas & Mercanti, LLP

(57) ABSTRACT

The present invention relates to a slurry containing water, amorphous silica panicles having a particle size less than 1 micron and silica flour with a particle size between 2-200 microns. In order to stablize the slurry, the slurry contains a polysaccharide. The invention further relates to a method for the production of a slurry containing water, amorphous silica having a particle size below 1 micron, and silica flour with a particle size between 2-200 microns, where a polysaccharide is added to a slurry of water and amorphous silica, whereafter the silica flour is mixed into the slurry of amorphous silica.

13 Claims, No Drawings

1

SILICON OXIDE SLURRY AND METHOD FOR PRODUCING SUCH SLURRY

This application is a 371 of PCT/NO03/00135, filed 24 Apr 2003.

FIELD OF INVENTION

The present invention relates to an additive for oil well cement containing amorphous silica particles and silica flour and to a method for producing such additive

BACKGROUND ART

From EP-B 467921 it is known a method for the mixture of silicon dioxide to a hydraulic cement slurry, where amorphous silica with particles smaller then 1 μm is mixed with water to form an aqueous slurry of microsilica whereafter silica flour with particles with a size from 2-200 μm are mixed into the suspension of amorphous silica particles. Finally, the produced liquid slurry is added to a cement slurry in a mixing tank.

The cement slurry produced according to the method of EP-B 467921 is particularly useful for cementing oil wells at high temperatures of above 100° C. as it has been found that this prevent long time reduction of strength of the cement.

In order to make full economic and practical use of the method according to EP-B 467921 the slurry containing amorphous silica and silica flour should be produced and transported to the cementing site for mixing to the cement slurry shortly before cementing. For use in cementing of oil wells offshore and on shore, this means that the slurry of microsilica and silica flour must be produced ashore and transported to a rig before it can be mixed into a cement slurry. Unfortunately it has been found that the suspension of amorphous silica and silica flour shows a strong tendency of settling resulting in such a short shelf life that the suspension cannot be transported for mixing into cement slurries. There is thus a need for a slurry of the type disclosed in EP-B 467921 which have a reduced tendency of settling and which is compatible with cement slurries.

DISCLOSURE OF INVENTION

By the present invention it has now been provided a slurry of amorphous silica and silica flour and a method for production of such slurry which shows a strongly reduced tendency of settling and which is compatible with cement slurries and which does not contain any toxic additives.

Thus, according to a first aspect, the present invention relates to a slurry containing water, amorphous silica particles having a particle size less then 1 micrometer and silica flour having a particle size between 2 and 200 μm, which slurry is characterized in that it contains a polysaccharide.

According to a preferred embodiment the polysaccharide is a cellulose derivate selected among xanthan, carboxymethylcellulose, hydroxymethylcellulose, hydroxyethylcellulose or mixtures of these compounds.

According to a further preferred embodiment the slurry contains between 0.01 and 3 grams of polysaccharide pr. litre of slurry and more preferably between 0.05 and 1.5 grams of polysaccharide pr. litre of slurry.

The amount of polysaccharide pr. litre of slurry is adjusted according to the chain length of the polysaccharide. When using polysaccharides having a short chain length, the amount of polysaccharide in the slurry is in the upper end of the ranges and when using polysaccharide having a long chain length the amount is in the lower part of the range.

In order to further increase the stabilizing effect of the polysaccharide, the slurry optionally contains one or more of dextrin, guar gum and locust bean gum.

The slurry according to the invention may contain varying amounts of amorphous silica and silica flour, but the amount of amorphous silica is generally between 15-50% by weight based on the weight of the slurry and the amount of silica flour is generally between 5 and 60% by weight based on the weight of the slurry.

The total amount of dry matter in the slurry is preferably between 40 and 80% by weight based on the weight of the slurry.

It has surprisingly been found that the slurry according to the invention is very stable and shows little or no tendency of settling even after two to three months storage. The slurry can thus be stored and transported to the sites where it is mixed into cement slurries. Further it has been found that the slurry according to the invention is compatible with cement slurries in that it gives an acceptable rheology of the cement slurries.

According to a second embodiment the present invention relates to a method for the production of a slurry containing water, amorphous silica having a particle size below 1 μm, and silica flour having a particle size between 2 and 200 μm, which method is characterized in that a polysaccharide is added to a slurry of water and amorphous silica, whereafter the silica flour is mixed into the slurry of amorphous silica.

According to a preferred embodiment the polysaccharide is preconditioned in a water-containing medium for at least 15 minutes before it is added to the slurry of water and amorphous silica.

The polysaccharide is preferably preconditioned in a slurry of water and amorphous silica.

According to a preferred embodiment the polysaccharide added to the slurry of amorphous silica and water is a cellulose derivate such xanthan, carboxymethylcellulose, hydroxymethylcellulose, hydroxyethylcellulose or mixtures of these compounds.

Preferably the silica flour is mixed into the slurry of water and amorphous silica using a high shear energy mixer.

The polysaccharide is preferably added to the slurry of amorphous silica and water in an amount necessary to provide a content of polysaccharide in the final slurry of 0.01 to 3 grams pr. litre and more preferably in an amount of 0.05 and 1.5 grams pr litre.

It has surprisingly been found that the addition polysaccharide to the slurry of amorphous silica and silica flour results in a stable slurry with a strongly reduced tendency of settling resulting in a strongly increased shelf life of the slurries. The preconditioning of the polysaccharide has shown to even further improve the stability of the final slurry. Further it has been found that the addition of polysaccharides gives acceptable rheological properties for oil well cement slurries containing the slurries according to the invention. Finally polysaccharides are generally non-toxic compounds which are approved to be used in connection with oil well cements.

DETAILED DESCRIPTION OF THE INVENTION

EXAMPLE 1

0.44 grams of xanthan pr. litre of final slurry was added to a slurry of amorphous silica and water containing 50% by weight of amorphous silica. The xanthan had been preconditioned in a small part of the slurry of water and amorphous silica for 24 hours before it was added. 850 grams pr litre of final slurry of silica flour having a mean particle size of 25 μm was thereafter added to the slurry using a high shear mixer. The final slurry was stored in 100 ml glass cylinders for 34 days. The samples in the glass cylinders had a 2 mm top layer of water after 34 days, but no resistance was found when lowering a rod to the bottom of the cylinder. The samples were very fluid and when the cylinders were emptied there was not found and settling in the bottom of the cylinders.

For comparison purposes an identical slurry was made, but without the addition of xanthan. After 7 days it was found that excessive settling had occurred. The cylinder had a 25 mm top layer of water and a hard layer was found in the bottom of cylinder which layer could not be redispersed. The hard layer consisted of silica flour.

EXAMPLE 2

A slurry according to the invention was made in the same way as described in Example 1, except that 0.22 grams of hydroxyethylcellulose was added instead of xanthan. The slurry was filled into a glass cylinder. After 1 week storage the slurry had a 10 mm top layer of water and no hard bottom layer was found.

EXAMPLE 3

A slurry according to the invention was made in the same way as described in Example 1., except that 0.22 grams carboxymethylcellulose was added instead of xanthan. The slurry was filled into a glass cylinder. After 1 week storage the slurry had a 8 mm top layer of water and no hard bottom layer was found.

The above examples show that the slurry according to the invention has a strongly reduced settling compared to the prior art slurry.

EXAMPLE 4

A slurry of amorphous silica and silica flour containing xanthan according to the present invention and made according to Example 1 was added to an oil well cement slurry in an amount necessary to provide a total SiO2 content in the cement slurry of 35% by weight based on the weight of cement. The slurry had a density of 1.9 g/cm$^3$. This slurry is denoted slurry A For comparison purpose it was made an identical cement slurry B except that cement slurry B was made by adding a slurry of amorphous silica and silica flour that did not contain a polysaccharide additive.

The rheological properties of the two cement slurries were measured according to API Specification 10 and the results are shown in Table 1.

TABLE 1

| Cement slurry | A | B |
|---|---|---|
| Rheology (20° C.) | | |
| Plastic viscosity, cp | 64.5 | 48 |
| Yield point, lb/100 ft$^3$ | 8.5 | 3 |

TABLE 1-continued

| Cement slurry | A | B |
|---|---|---|
| Rheology (88° C.) | | |
| Plastic viscosity, cp | 45 | 37.5 |
| Yield point, lb/100 ft$^3$ | 6 | 1.5 |

As can be seen from Table 1, the rheological properties of a cement slurry containing the slurry of amorphous silica and silica flour according to the invention does not deviate much from the same properties of the prior art slurry B and are well within the ranges accepted for oil well cement slurries.

The invention claimed is:

1. A stable, storable slurry consisting essentially of water, amorphous silica particles having a particle size less than 1 um, silica flour with a particle size between 2-200 um, and a preconditioned polysaccharide as a stabilizer, wherein the polysaccharide has been in a water medium for at least 15 minutes before it is added.

2. The slurry according to claim 1, wherein the polysaccharide is selected from the group consisting of xanthan, carboxymethylcellulose, hydroxymethylcellulose, hydroxyethylcellulose and mixtures of these compounds.

3. The slurry according to claim 1, wherein the slurry comprises between 0.01 and 3 grams of polysaccharide per liter of slurry.

4. The slurry according to claim 1, wherein the slurry comprises between 0.05 and 1.5 grams of polysaccharide per liter of slurry.

5. The slurry according to claim 1, wherein the slurry further comprises one or more of dextrin, guar gum and locust bean gum.

6. A method for the production of a slurry containing water, amorphous silica having a particle size below 1 um, and silica flour with a particle size between 2-200 um, comprising: adding a polysaceharide to a slurry of water and amorphous silica, where after mixing the silica flour into the slurry of amorphous silica.

7. The method according to claim 6, wherein the polysacoharide is in a water containing medium for at least 15 minutes before adding to the slurry.

8. The method according to claim 7, wherein the water medium is a slurry of water and amorphous silica.

9. The method according to claim 6, wherein the silica flour is mixed into the slurry of water and amorphous silica using a high shear energy mixer.

10. The method according to claim 6, wherein the polysaccharide is added to the slurry of amorphous silica and water in an amount necessary to provide a content of polysaccharide in the final slurry of 0.01 to 3 grams per liter.

11. The method according to claim 10, wherein the polysaccharide is added to the slurry of amorphous silica and water in an amount necessary to provide a content of polysaccharide in the final slurry of 0.1 and 1.5 grams per liter.

12. The method according to claim 6, wherein the polysaccharide is selected from the group consisting of xanthan, carboxymethylcellulose, hydroxymethylcellulose, hydroxyethylcellulose and mixtures of these compounds.

13. The method according to claim 6, wherein the product further comprises one or more of dextran, guar gum and locust bear gum.

* * * * *